(12) United States Patent
Hill et al.

(10) Patent No.: US 9,616,744 B2
(45) Date of Patent: Apr. 11, 2017

(54) VEHICLE STORAGE SYSTEM WITH VAPOUR CONTROL

(71) Applicant: Plastic Omnium Advanced Innovation and Research, Brussels (BE)

(72) Inventors: David Hill, Commerce Township, MI (US); Yazid Belkhelfa, Louvres (FR); Bjorn Criel, Sint-Martens-Lennik (BE); Jules-Joseph Van Schaftingen, Wavre (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 0 days.

(21) Appl. No.: 14/900,488

(22) PCT Filed: Jun. 26, 2014

(86) PCT No.: PCT/EP2014/063468
§ 371 (c)(1),
(2) Date: Dec. 21, 2015

(87) PCT Pub. No.: WO2014/207083
PCT Pub. Date: Dec. 31, 2014

(65) Prior Publication Data
US 2016/0368371 A1     Dec. 22, 2016

Related U.S. Application Data

(60) Provisional application No. 61/839,538, filed on Jun. 26, 2013.

(30) Foreign Application Priority Data

Jul. 12, 2013    (EP) ..................................... 13176402

(51) Int. Cl.
*B60K 15/00*     (2006.01)
*B60K 15/035*    (2006.01)

(52) U.S. Cl.
CPC .. *B60K 15/03504* (2013.01); *B60K 15/03519* (2013.01); *B60K 2015/03514* (2013.01)

(58) Field of Classification Search
CPC ........ B60K 15/03504; B60K 15/03519; B60K 2015/03514
(Continued)

(56) References Cited

U.S. PATENT DOCUMENTS 5,718,210 A * 2/1998 Ito ...................... F02M 25/0809
                                                    123/198 D
2007/0113831 A1    5/2007 Hoke et al.
(Continued)

FOREIGN PATENT DOCUMENTS

WO    10 2010 019 373 A1    11/2011
WO        2012/131885 A1     6/2014

OTHER PUBLICATIONS

International Search Report and Written Opinion Issued Oct. 20, 2015 in PCT/EP14/063468 Filed Jun. 26, 2014.

*Primary Examiner* — Kevin Hurley
*Assistant Examiner* — Marlon A Arce
(74) *Attorney, Agent, or Firm* — Oblon, McClelland, Maier & Neustadt, L.L.P.

(57) ABSTRACT

A vehicle storage system with vapor control. The storage system includes: a vehicle tank including a vapor outlet, a filter unit including a filter inlet and outlet, a housing including a first port communicating with the vapor outlet, a second port communicating with the filter inlet, a third port communicating with the filter outlet, and a fourth port. A closure body is moveably arranged in the housing, the closure body configured to: close the third and fourth ports (Continued)

in a first position of the closure body, create in the housing a barrier between a first volume and a second volume in a second position of the closure body, the first volume forming a passage between the first and second ports, and the second volume forming a passage between the third and fourth ports, and close the first and second ports in a third position of the closure body.

32 Claims, 20 Drawing Sheets

(58) Field of Classification Search
USPC .............................. 123/519, 518, 522, 523
See application file for complete search history.

(56) References Cited

U.S. PATENT DOCUMENTS

| | | |
|---|---|---|
| 2014/0007849 A1 | 1/2014 | Nagasaku |
| 2016/0069304 A1* | 3/2016 | Guidi ................. F02M 25/0809 123/518 |
| 2016/0186699 A1* | 6/2016 | Fukui .................. B60K 15/035 123/520 |
| 2016/0258390 A1* | 9/2016 | Makino .............. F02M 25/0836 |

* cited by examiner

VEHICLE STORAGE SYSTEM WITH VAPOUR CONTROL

TECHNICAL FIELD

Embodiments of the invention relate to the field of vehicle storage systems with vapour control, and to modules for use in a such systems. More generally, the invention relates to the field of conventional vehicles and hybrid vehicles.

BACKGROUND

Due to increased emission standards, nowadays vehicles typically include a fuel vapour recovery system. Such a fuel vapour recovery system includes a canister for receiving fuel vapours generated in the fuel tank. A fuel vapour absorbent material located in the canister retains the fuel vapour when displaced from the fuel tank, e.g. during refueling. During operation of the engine, the fuel vapour contained in the canister may be purged by drawing fresh air through the canister. In fuel vapour recovery systems, there is provided a vapour vent valve between the tank and an inlet of the canister for being capable of blocking the entrance of vapour from the fuel tank in the canister. Further, there is provided a canister vent valve between an air vent and an outlet of the canister. For example, during filling or at elevated temperatures, the vapour vent valve and the canister vent valve are open, so that a fuel vapour can flow from the fuel tank into the canister, and fresh air can flow out in the atmosphere through the canister vent valve, allowing the pressure in the fuel tank to be reduced. During normal engine operation, the vapour vent valve may be closed while the canister vent valve is open to allow the flow of air into the outlet of the canister, through the canister medium and through a canister purge valve allowing the fuel vapour stored in the canister to be delivered to the engine. In prior art systems, there is required a vapour vent valve and a canister vent valve to perform those functions.

SUMMARY

The object of embodiments of the invention is to provide a vehicle storage system with vapour control, which is more compact, and reduces the number of required components.

To that end, the vehicle storage system comprises a vehicle tank having a vapour outlet; a filter unit, typically a canister, having a filter inlet and a filter outlet; and a valve housing comprising a moveably arranged closure body. The valve housing has a first port communicating with the vapour outlet, a second port communicating with the filter inlet, a third port communicating with the filter outlet, and a fourth port typically communicating to the atmosphere and/or to a secondary dust filter. The closure body is moveably arranged in the housing, and is configured for closing the third port and the fourth port in a first position of the closure body;

for creating a barrier between a first volume and a second volume in said housing in a second position of the closure body, said first volume forming a passage between the first port and the second port, and said second volume forming a passage between the third port and the fourth port; and for closing the first port and the second port in a third position of the closure body.

Embodiments of the invention are based inter alia on the inventive insight that the function of the canister vent valve can be combined with the function of the vapour vent valve.

More in particular, the inventors have realised that those valves do not need to be closed at the same time, and that it is possible to realise the function of those two valves with a specially adapted module including a closure body which is moveable in at least three positions. Indeed, by having a closure body that can be positioned in three positions, the required vapour control can be performed:

In the first position the third and fourth port are closed so that the filter outlet can be disconnected from the atmosphere. Such a position is typically desirable when parking as in the case of sealed fuel systems or when performing leak detection for OBD requirements.

In the second position vapour from the tank is filtered by the filter unit and next emitted in the atmosphere. Such a position is typically desirable when refueling the tank.

In the third position the communication between the vapour outlet of the tank and the filter inlet is blocked. Such a position is typically desirable at the end of refueling or during purging.

In other words, embodiments of the invention can perform the same functionalities as prior art solutions, whilst having the advantage of being more compact and requiring fewer components compared to prior art solutions.

Advantageous embodiments of the invention are disclosed in the dependent claims.

In a preferred embodiment, the vehicle tank is a fuel tank and the filter unit is a evaporation canister. However, it may be envisaged to use the invention in other types of tanks with filter unit where vapour control is required.

Preferably, the vehicle storage system comprises an actuator configured for positioning the closure body in at least the first, second and third position, as well as a controller for controlling the actuator.

In a preferred embodiment, the vehicle storage system comprises a detection means configured for detecting a filling modus, in which liquid is added in the vehicle tank. In particular embodiments, there may be provided a button in the vehicle, which a driver needs to press when he wishes to refuel the vehicle. When it is detected that this button has been pressed, the controller controls the actuator to place the closure body in the second position. Also, the vehicle storage system may comprise a purging system configured for purging the filter unit in a purging modus. Upon entering the purging modus, the controller controls the actuator to place the closure body in the third position. In a further developed variant, there may be provided a detection means for detecting a leakage modus or a parking modus of the vehicle. A controller may then control the actuator to place the closure body in the first position upon detection of the leakage modus or the parking modus. In other words, the different modi can be adequately addressed using embodiments of the invention.

According to another aspect of the invention, there is provided a vehicle storage system comprising a vehicle tank, a filter unit, and a valve module comprising an electromechanical actuator for controlling the valve module. The electromechanical actuator preferably comprises a solenoid coil and a solenoid core, wherein the solenoid core is coupled with a closure body for closing/opening the valve module. Preferably, the valve module comprises a housing with four ports and a closure body configured as describe above. In such an embodiment, the solenoid core is coupled with the closure body for moving and/or keeping the closure body to/in the first, second or third position, in function of the power in the solenoid coil. In a further developed embodiment, the actuator may comprise at least one permanent magnet or at least one mechanical stop arranged for maintaining the closure body in any position of the first, second and third position, or in one particular position of the first, second and third position. The at least one permanent magnet or the at least one mechanical stop is configured in such a way that the closure body can be moved away from any position to any other position by powering the solenoid coil in a predetermined way. More in particular the force generated by the solenoid coil on the closure body needs to be higher than the force exerted on the closure body by the permanent magnet or the mechanical stop. Such embodiments have the advantage that the solenoid coil does not need to be constantly powered for keeping the closure body in a particular position.

In a possible embodiment, the closure body may comprise a diaphragm fixed in the valve housing. Preferably, the diaphragm is a component made of two materials mechanically or chemically bonded together. The diaphragm may comprise at least one rigid part and at least one flexible part, wherein the terms "rigid" and "flexible" refer to the fact that the at least one rigid part is less flexible than the at least one flexible part. Preferably, the rigid part is configured for ensuring the closing in the first and third position of the closure body, and the flexible part is configured for allowing movement of the closure body between the first, second and third position. In an exemplary embodiment, the diaphragm may comprise a flexible membrane provided at a first side with a first rigid layer, and at a second side with a second rigid layer. Preferably, the first and second rigid layers are configured for ensuring the closing in the first and third position of the closure body, respectively. The flexible membrane is configured for allowing movement of the closure body between the first, second and third position. In particular embodiments the membrane can be overmoulded in such a way that it covers the rigid layers in the location of sealing so as to provide compliance to any imperfections in the sealing surface and to reduce the required sealing force. Such an embodiment has the advantage that a perfect vapour barrier can be obtained between the first volume and the second volume. Also, the guiding of the closure body can be improved.

Advantageously, the diaphragm acts as an OPR (over-pressure relief) and or UPR (under-pressure relief) depending on the position of module.

In other embodiments, the closure body may be a one-piece or multi-piece component that is guided in the housing. In a first exemplary embodiment, the closure body is guided in the housing for being translated between the first, second and third position, and the actuator is configured for causing said translating. In a second exemplary embodiment, the closure body is rotatably mounted in the housing, and the actuator is configured for rotating the closure body to the first, second or third position. If the closure body is a multipart component, the multiple parts are typically moved synchronously.

In a preferred embodiment, the housing is arranged on the vehicle tank, preferably on a mounting flange arranged in a wall of the vehicle tank. Such an embodiment allows obtaining a very compact vehicle storage system, wherein the valve functionalities are grouped for a large part on the tank. In another embodiment, the housing may be arranged on the carbon canister. Such an embodiment allows reducing the amount of fluid lines required for performing the various functions of the housing.

According to another embodiment the housing is arranged adjacent the filter unit, the filter unit preferably being a canister comprising absorbent material. Preferably, the second port and the third port extend in the canister. In an advantageous embodiment thereof a buffer wall separating the first and second port extends in the absorbent material of the canister. In that way a vapour rich chamber and a vapour free chamber me be created in the canister including a vapour control mechanism in a very compact manner.

In a further embodiment, the vehicle tank is provided with a filler pipe which is closable by a fuel cap. The filler pipe has an end adjacent the fuel cap which is connected through a recirculation line with the filter inlet. It is noted that this may be a direct or indirect connection. In particular embodiments, the recirculation line may be connected with the second port which is connected with the filter inlet.

According to another aspect of the invention, there is provided a module for use in a vehicle system with vapour control. The module comprises a housing having a first port, a second port, a third port and a fourth port. A closure body is moveably arranged in said housing. The closure body is configured for closing the third and the fourth port in a first position of the closure body; for creating a barrier in said housing between a first volume and a second volume in a second position of the closure body; said first volume creating a passage between the first and the second port and said second volume creating a passage between the third and fourth port; and for closing the first and the second port in a third position of the closure body.

It is noted that the term "barrier" refers to a vapour barrier, or in other words, the barrier ensures that the passage of vapour from the first volume to the second volume, and vice versa, is blocked.

The preferred features of the closure body and the housing disclosed above in connection with the vehicle storage system may also be implemented in the module, and are not repeated here. The same applies for the preferred features of the actuator and the controller.

In a preferred embodiment of the module, there is provided an over-pressure relief mechanism and/or an under-pressure relief mechanism in a wall of the housing. The over-pressure relief mechanism and/or under-pressure relief mechanism may be provided in a wall part near the first port communicating with the vapour outlet of the tank, and/or in a wall part near the fourth port communicating with the fresh air inlet.

If the over-pressure relief mechanism and under-pressure relief mechanism is provided in a wall part near the first port communicating with the vapour outlet of the tank, it will be possible to ensure that the pressure in the tank does not increase above an upper critical value and does not decrease below a lower critical value, regardless of the position of the closure body. If the over-pressure relief mechanism and under-pressure relief mechanism is provided in a wall part near the fourth port communicating with the fresh air inlet, it can be ensured that the pressure in the tank does not increase above an upper critical value and does not decrease below a lower critical value when the closure body is in the first position, i.e. when the fresh air port is closed, which situation may occur e.g. during driving in cars of certain car manufacturers.

In a further developed embodiment of the module, the housing may be provided with a recess for an electronic control unit. This electronic control unit may be configured for being connected with at least one active component in the tank, e.g. a temperature sensor, a pressure sensor, a level gauge, hydrocarbon sensor, canister load sensor, fuel pump, etc.; and/or with a CAN bus; and/or with a fuel cap position sensor for detecting the position of the fuel cap; and/or with a fuel cap lock solenoid for (de)activating a locking of the fuel cap; and/or with a liquid pressure sensor for measuring the pressure of liquid fuel in a line between the vehicle tank and the engine; and/or HC sensor; and/or canister load sensor; and/or fuel pump.

Finally, the invention relates to a use of an embodiment of a module as disclosed above in a vehicle storage system with vapour control.

In an advantageous embodiment, the valve module of the present invention is configured such that it allows a control of the pressure during parking and/or driving of the vehicle.

In yet another advantageous embodiment, the valve module of the present invention is configured such that it allows a control of the pressure during the driving cycle of the vehicle. According to another aspect of the invention, there is provided a method of using the above-described module for controlling the pressure within a vehicle storage system during the driving cycle of the vehicle in response to internal tank pressure and the operation of the thermal engine in order to avoid excessive positive or negative pressure in the vehicle storage system.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIGS. 1A-1C illustrate a first embodiment of a vehicle storage system with vapour control according to the invention. The system comprises a vehicle tank 110, a filter unit in the form of a canister 120, and a module 130. In FIGS. 1B and 1C only the module 130 is shown. The vehicle tank 110 has a vapour outlet 111 connected to a first port 141 of the module 130. The canister 120 has a canister inlet 121, a canister outlet 122, and a purge line outlet 123 leading to the engine. The module 130 comprises a housing 131 having a first port 141, a second port 142, a third port 143, and a fourth port 144. The second port 142 communicates with the canister inlet 121. The third port 143 communicates with the canister outlet 122. The fourth port 144 is in communication with the atmosphere 100. A closure body 133 is movably arranged in the housing 131. The closure body 133 is moved by an actuator 150. A controller (not illustrated) is used to control the actuator 150 (comprising parts 151 and 152) in order to move the closure body 130 in a desirable position.

Figure 1A:
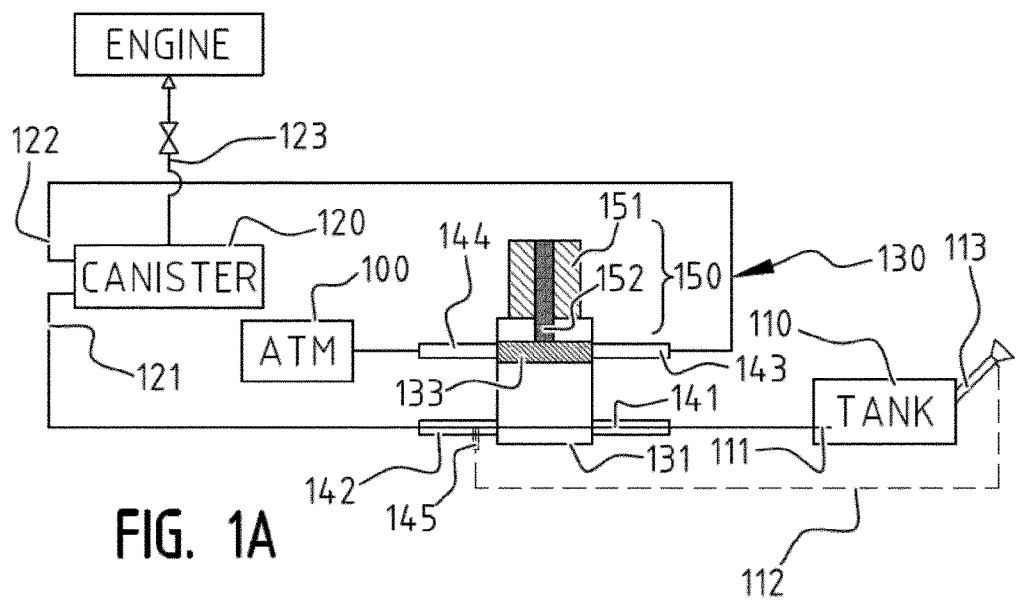
FIGS. 1A-1C are schematic views illustrating a first embodiment of a vehicle storage system of the invention, wherein the closure body is located in a first, a second, and a third position, respectively.
Figure 1B:
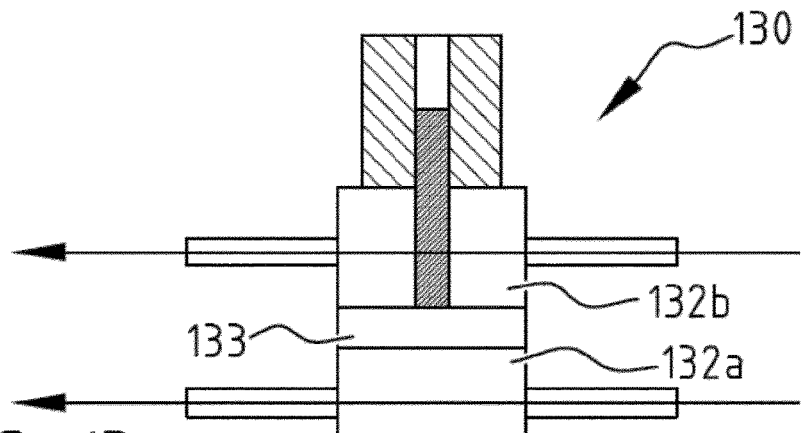
Figure 1C:
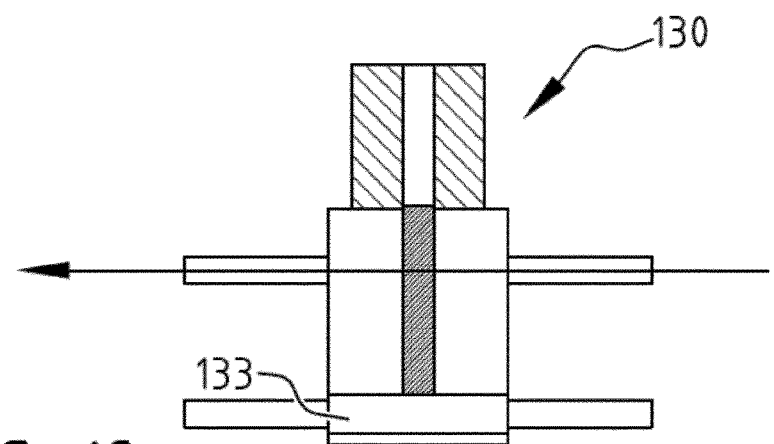

The closure body 133 can be placed in three respective positions illustrated in FIGS. 1A-1C. In a first position illustrated in FIG. 1A, the closure body 133 closes the third port 143 and the fourth port 144. In the first position, the fuel tank 110 communicates with the inlet 121 of the canister 120, while the communication between the outlet 122 and the atmosphere 100 is blocked. This first position is typically used when the vehicle is in the parking position or during leak detection for OBD requirements.

In a second position of the closure body 133, a barrier is created between a first volume 132a and a second volume 132b. The first volume 132a defines a passage between the first port 141 and the second port 142, and the second volume 132b defines a passage between the third port 143 and the fourth port 144. Typically, the closure body 133 is put in this second position when it is desirable to depressurize or refill the tank. When refueling, the fuel vapours run from the tank through the canister 120 into the atmosphere 100. Further fuel vapours present in the filler pipe 113 of the tank can also escape through the canister 120 into the atmosphere via a recirculation line 112 which is connected to the line between second port 142 and the canister inlet 121, see the dotted lines in FIG. 1A. There could be provided a fifth port 145 for the recirculation line 112. The fifth port 145 communicates with the second port 142 irrespective of the position of the closure body 133.

In an advantageous embodiment, the module 130 is configured and controlled in such a way as to implement a predetermined depressurization sequence. In a preferred embodiment, the depressurization sequence can consist of the following sequence of steps:
  depressurization of the filler pipe 113;
  opening of the filler cap of the filler pipe;
  introduction of the refueling nozzle;
  start refueling of the vehicle tank 110.

Such depressurization sequence allows to reduce the time needed between the moment the driver requests a refueling operation and the moment he is allowed to open the fuel cap. The depressurization of the rest of the vehicle tank 110 may start substantially simultaneously with the depressurization of the filler pipe 113 and continue thereafter, in order to have a very low pressure at the start of the refueling operation. Alternatively, the depressurization of the rest of the vehicle tank 110 could start when the depressurization of the filler pipe 113 is finished.

Preferably, the module 130 is further configured to prevent reverse flows from the canister 120 to the fuel tank 110 or the filler neck 113 at all times.

In a third position of the closure body 133, see FIG. 1C, the first port 141 and the second port 142 are closed, while the third port 143 and the fourth port 144 are open and can communicate with each other. In this third position, the tank is fully sealed and there is no communication between the tank and the canister. Only the recirculation line 112 can communicate with the canister 120. In the third position, the outlet 122 of the canister communicates with the atmosphere 100. The closure body 133 will be placed in the third position e.g. at the end of refueling, or when purging the canister. When purging, air is drawn into the outlet 122 of the canister 120, through the canister medium, and through a canister purge valve (not illustrated) allowing the fuel vapour stored in the canister 120 to be delivered to the engine (not illustrated).

In the first embodiment, the actuator 150 comprises a solenoid coil 151 and a solenoid core 152. The solenoid core 152 is connected to the closure body 133 for moving the closure body to the first, second, or third position in function of the power in the solenoid coil 151. The closure body 133 is guided in the housing 131 for being translated between the first, second and third position. In order to obtain an appropriate sealing, one or more O-rings may be provided around the closure body 133.

In FIGS. 1A-1C the valve module 130 is shown in cross-section. In a typical embodiment, the housing 131 has a cylindrical wall, and the closure body 133 is a cylindrical body adapted for matching the inner diameter of the housing 131. However, also other shapes fall within the scope of the invention.

Figure 1D:
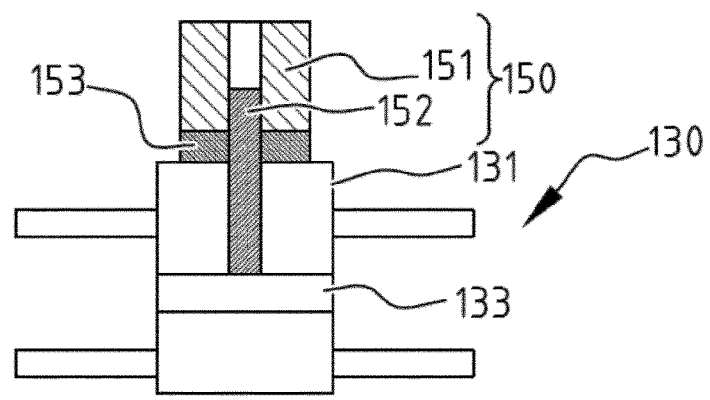
FIGS. 1D and 1E illustrate two variants of the module of FIGS. 1A-C.
Figure 1E:
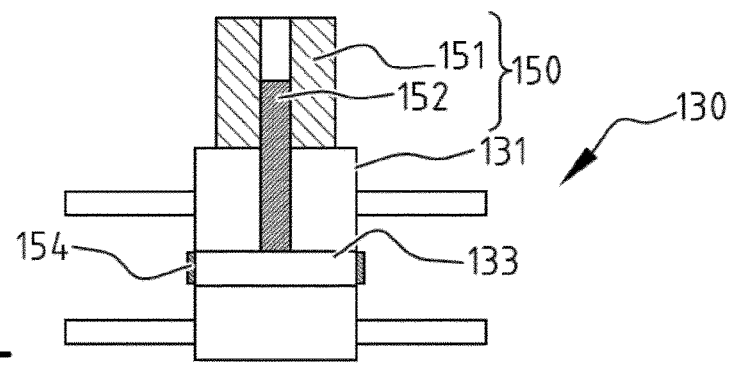

FIGS. 1D and 1E illustrate two variants of the embodiment of FIGS. 1A-1C. In the embodiment of FIG. 1D the actuator 150 comprises a permanent magnet 153 in addition to a solenoid coil 151 and a solenoid core 152. The permanent magnet 153 is arranged around the solenoid core 152, between the solenoid coil 151 and the housing 131. In that way the permanent magnet can keep the closure body in any of the three positions without the need for activating the coil 151. The coil 151 only needs to be activated for changing the position of the closure body 133. This is advantageous for avoiding damage of the coil 151 caused by thermal effects as well as reducing the overall power consumption of the valve which has a certain environmental benefit.

In the embodiment of FIG. 1E the actuator 150 comprises a permanent magnet 154 in addition to a solenoid coil 151 and a solenoid core 152. The permanent magnet 154 is arranged around the housing 131 at the level of the second position of the closure body 133, such that the permanent magnet 154 surrounds the closure body 133 in the second position of the closure body 133. In that way the permanent magnet 154 can keep the closure body 133 in the second position without the need for activating the coil 151.

Other non-illustrated variants may use a mechanical stop which can be pressed away by the closure body 133 upon activation of the coil 151, such as a spring and ball assembly. Such mechanical stops could be provided at different locations in the housing 131 for being capable of keeping the closure body 133 in any of the three positions. When activating the coil 151 for changing the position of the closure body 133, the force exerted on the solenoid core 152 should be sufficient to pass a mechanical stop.

Figure 2A:
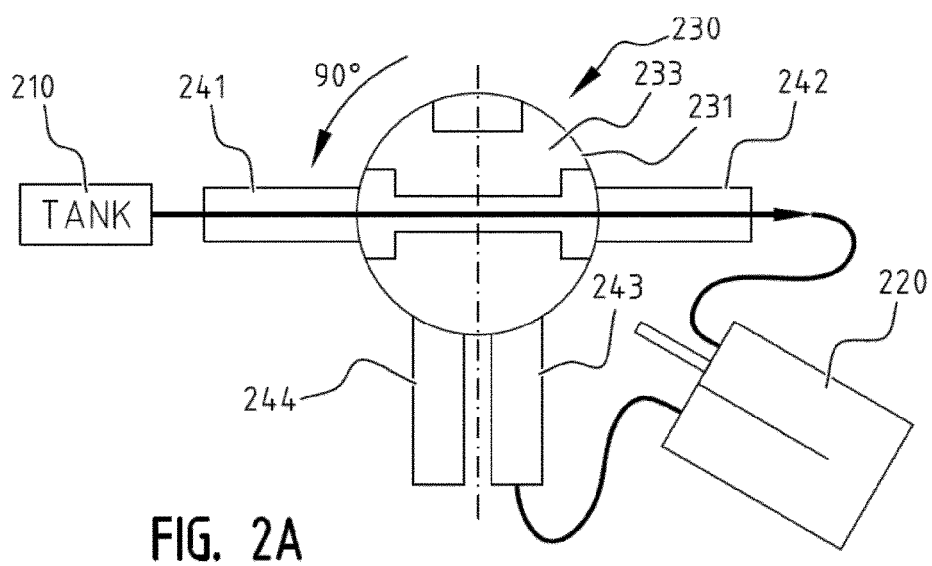
FIGS. 2A-2E illustrate schematically a second embodiment of a vehicle storage system of the invention in a first, a second, a third, and a fourth position, respectively.
Figure 2B:
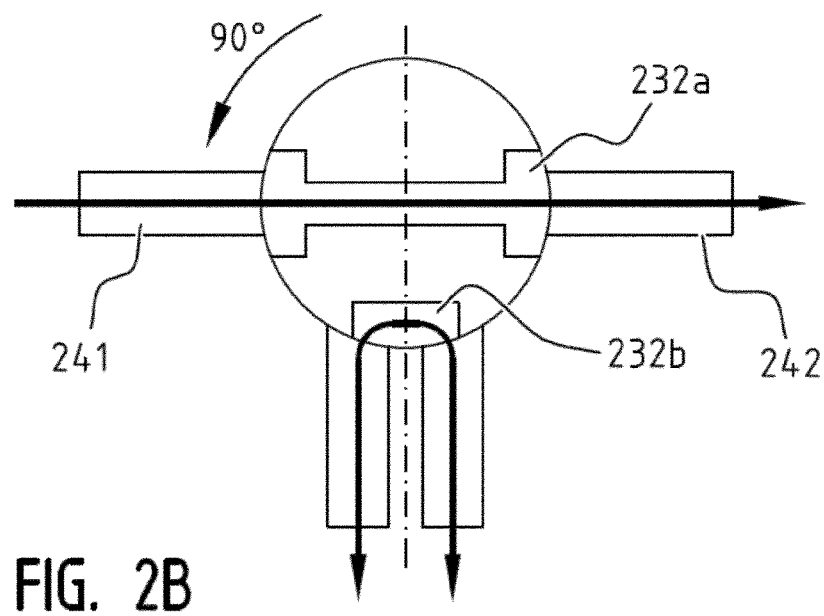
Figure 2C:
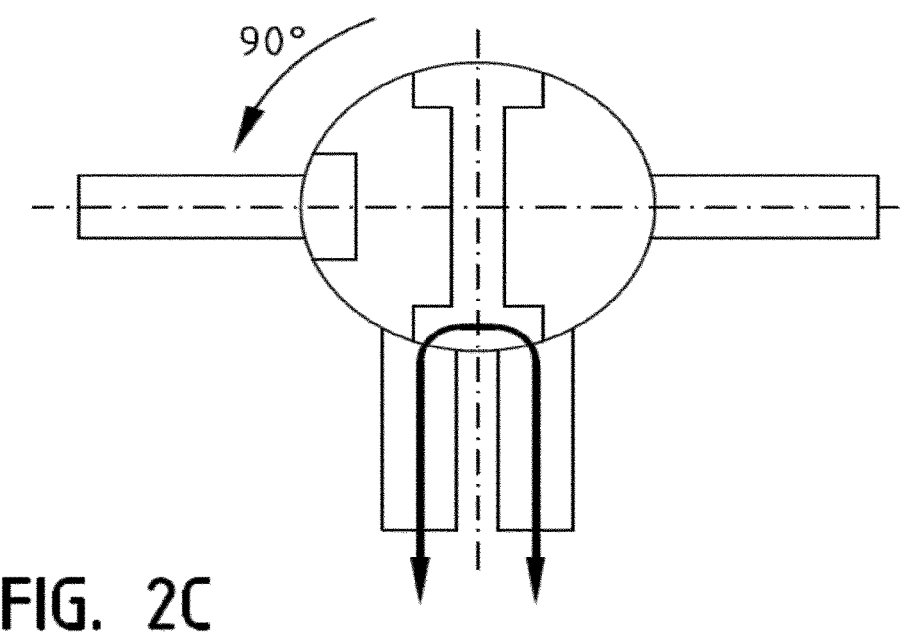
Figure 2D:
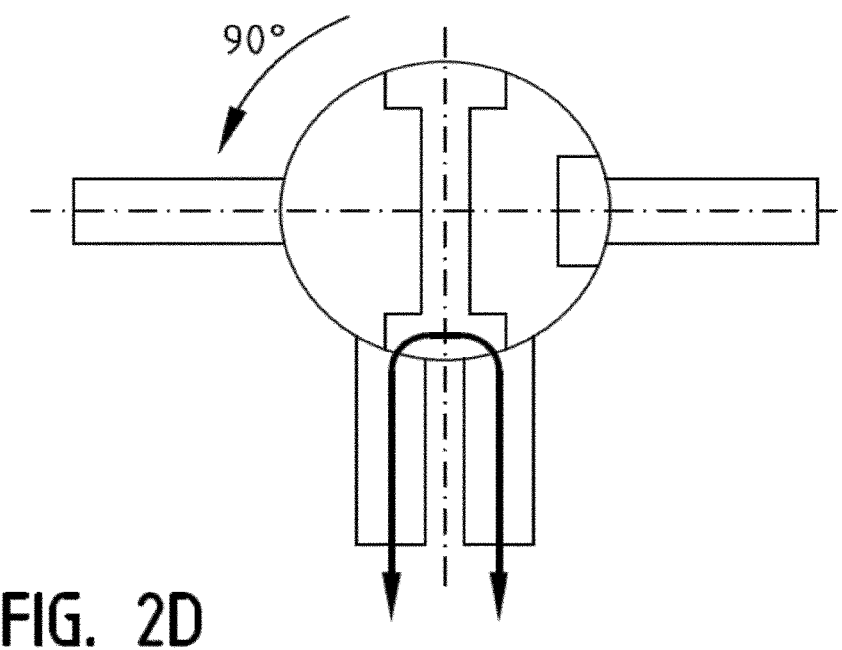

FIGS. 2A-2D illustrate a second embodiment of a vehicle storage system with vapour control according to the invention. The system comprises a vehicle tank 210, a canister 220 and a module 230. The module 230 comprises a housing 231 in which a closure body 233 is rotatably mounted. The housing 231 is provided with a first port 241 communicating with a vapour outlet of the tank 210, a second port 242 communicating with an inlet of the canister 220, a third port 243 communicating with an outlet of the canister 220, and a fourth port 244 communicating with the atmosphere. The closure body 233 is configured for closing the third port 243 and the fourth port 244 in a first position, see FIG. 2A;

for creating in the housing 231 a vapour barrier between a first volume 232*a* and a second volume 232*b* in a second position of the closure body 233, see FIG. 2B. The first volume 232*a* defines a passage between the first port 241 and the second port 242, and the second volume 232*b* defines a passage between the third port 243 and the fourth port 244. In the second embodiment the barrier is formed by a part of the closure body 233, whilst in the embodiment of FIGS. 1A-C the barrier was formed by the entire closure body 133.

for closing the first port 241 and the second port 242 in a third and a fourth position of the closure body 233, see FIG. 2C and FIG. 2D. It is noted that the presence of a two different positions of the closure body for closing the first and second port is not required. However, by providing those two positions, a rotation over 90° is the maximum that is needed to place the closure body in a position where the first port 241 and the second port 242 are closed.

The closure body 233 may be composed of one single part or may be composed of multiple parts. If multiple parts are used, those parts are preferably moved synchronously. Alternatively, those multiple parts may be connected to each other.

Figure 2E:
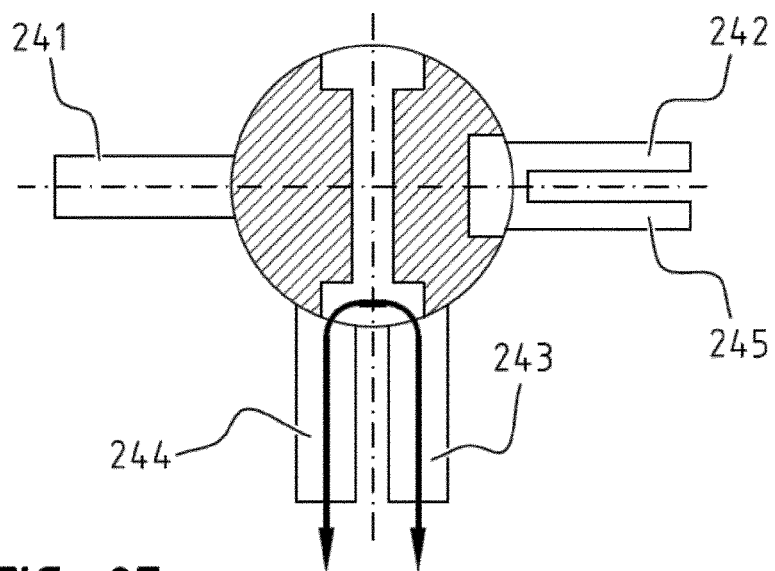

FIG. 2E illustrates a variant of the second embodiment of FIGS. 2A-2D, where five ports are provided. Compared to the second embodiment, a fifth port 245 has been added for connection with a recirculation line communicating with the filler pipe of the tank. In all four positions of the closure body 233, the second port 242 and the fifth port 245 are in fluid communication with each other.

Figure 3A:
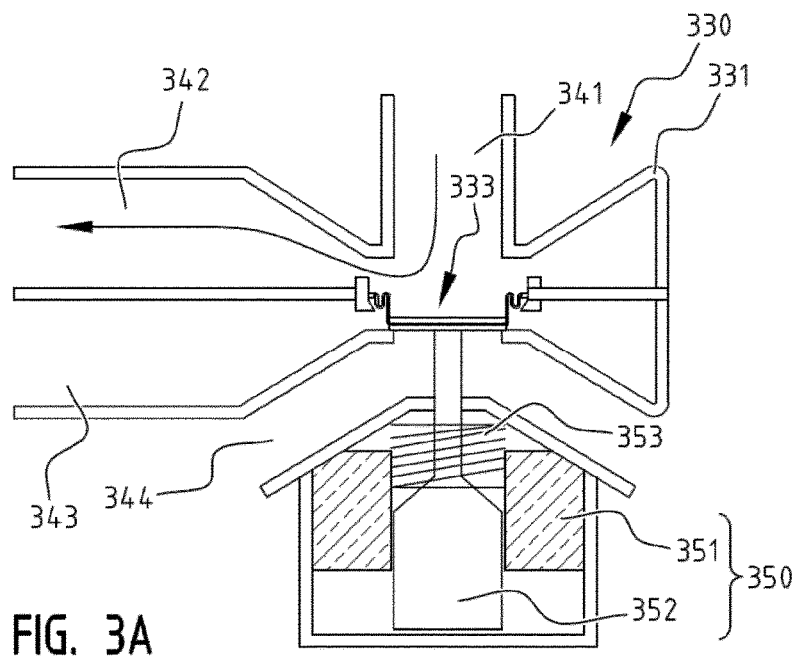
FIGS. 3A-3C are schematic views illustrating a third embodiment of a vehicle storage system of the invention, wherein the closure body is located in a first, a second, and a third position, respectively.
Figure 3B:
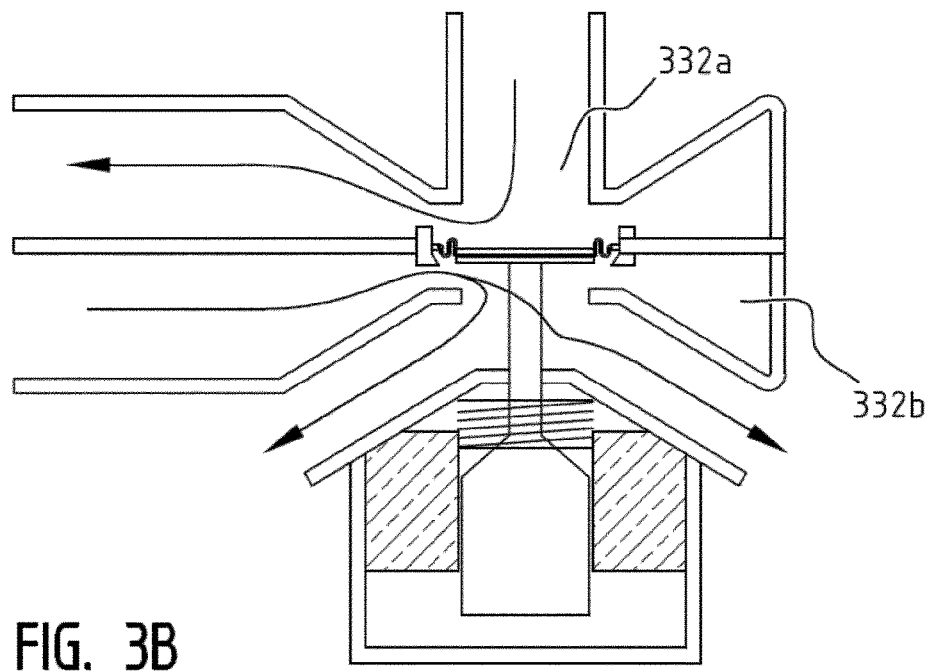
Figure 3C:
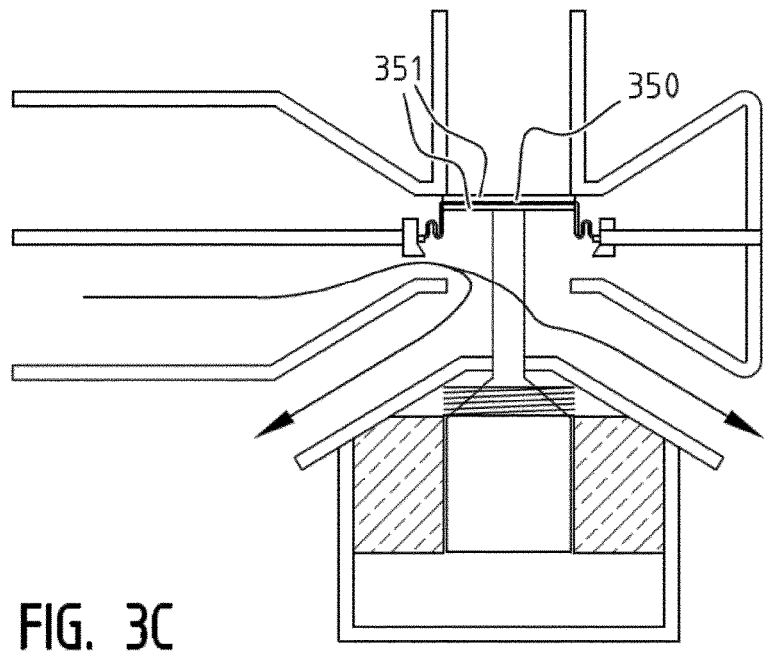

FIGS. 3A-3C illustrate a third embodiment of a module for a vehicle storage system with vapour control according to the invention. The module 330 comprises a housing 331 having a first port 341, a second port 342, a third port 343, and a fourth port 344. The second port 342 is intended for communicating with a canister inlet. The third port 343 is intended for communicating with a canister outlet. The fourth port 344 is in communication with the atmosphere. A closure body 333 is movably arranged in the housing 331. The closure body 333 is moved by an actuator 350. A controller (not illustrated) is used to control the actuator 350 in order to move the closure body 330 in a desirable position. The closure body 333 can be placed in three respective positions illustrated in FIGS. 3A-3C. In a first position illustrated in FIG. 3A, the closure body 333 closes the third port 343 and the fourth port 344. In the first position, the fuel tank communicates with the inlet 321 of the canister, while the communication between the outlet 322 and the atmosphere is blocked. In a second position of the closure body 333, a barrier is created between a first volume 332*a* and a second volume 332*b*. Typically, the second position is used for depressurizing or refueling the tank. When refueling, the fuel vapours run from the tank through the canister into the atmosphere. In a third position of the closure body, see FIG. 3C, the first port 341 and the second port 342 are closed, while the third port 343 and the fourth port 344 are open and can communicate with each other.

In the third embodiment, the actuator 350 comprises a solenoid coil 351 and a solenoid core 352, as well as a spring means 353. The solenoid core 352 is connected to the closure body 333 for moving the closure body to the first, second, or third position in function of the power in the solenoid coil 351. The spring means 353 ensure that the closure body 333, once placed in the second position, can be kept in the second position, so that the power to the solenoid coil 351 can be switched off.

In the third embodiment the closure body 333 is a diaphragm fixed in the valve housing 331. The diaphragm comprises a flexible sheet 350 surrounded by two rigid sheets 351. The surface of the flexible sheet 350 is larger than the surface of the rigid sheets, and the closure body 333 is fixed in the housing 331 along the circumference of the flexible sheet 350. The rigid sheets 351 may be manufactured from a plastic material or from a metal. The flexible sheet 350 is typically a flexible membrane. The flexible sheet may be fixed to the rigid sheets using any suitable bonding technique, e.g. an over-moulding technique.

Figure 4A:
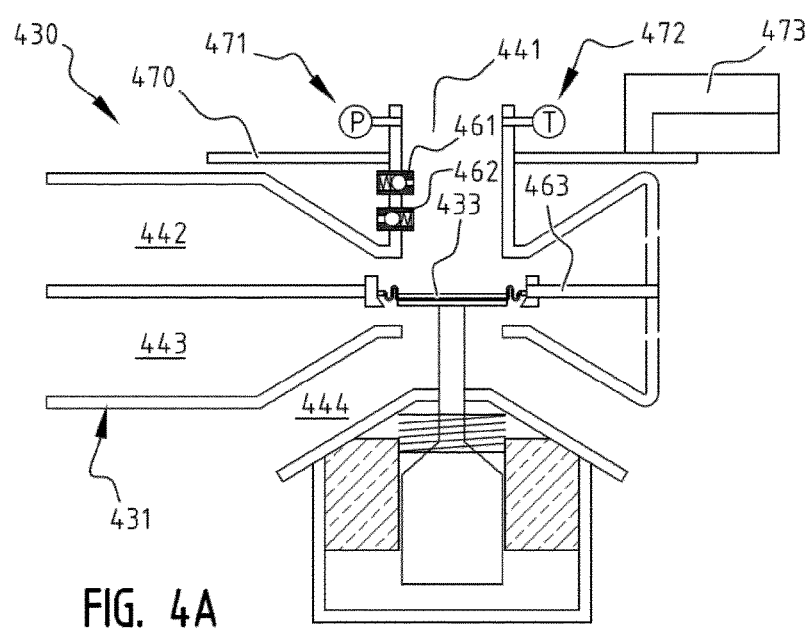
FIG. 4 illustrates schematically a fourth embodiment of a vehicle storage system of the invention.
Figure 4B:
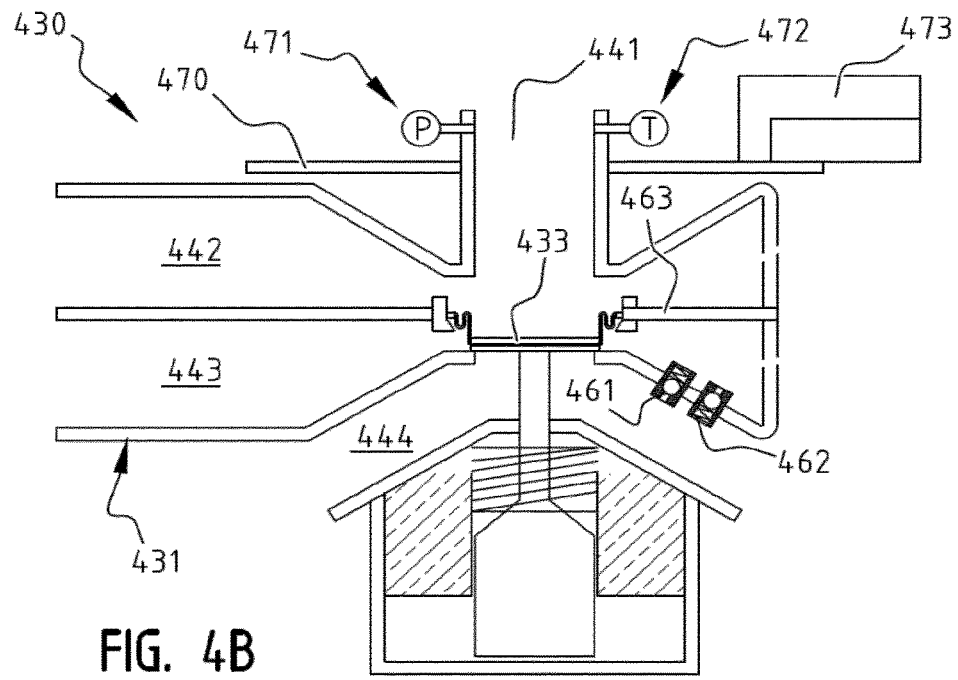

FIGS. 4A and 4B illustrate two further developed fourth embodiments of a module 430 according to the invention. The module is similar to the module of FIGS. 3A-3C, with this difference that two additional valves are inserted in a wall of the housing 431, namely an overpressure relief valve 461 and an under-pressure relief valve 462. In the variant of FIG. 4A the valves 461, 462 are mounted in a wall part near the first port 441 communicating with the vapour outlet of the tank. In that way it is ensured that the pressure in the tank does not increase above an upper critical value and does not decrease below a lower critical value, regardless of the position of the closure body. In the variant of FIG. 4B the valves 461, 462 are mounted in a wall part near the fourth port 444 communicating with the fresh air inlet. In that way it is ensured that the pressure in the tank does not increase above an upper critical value and does not decrease below a lower critical value when the closure body 433 is in the first position, i.e. when the fresh air port 444 is closed, which situation may occur e.g. during driving, in cars of certain car manufacturers.

Figure 4C:
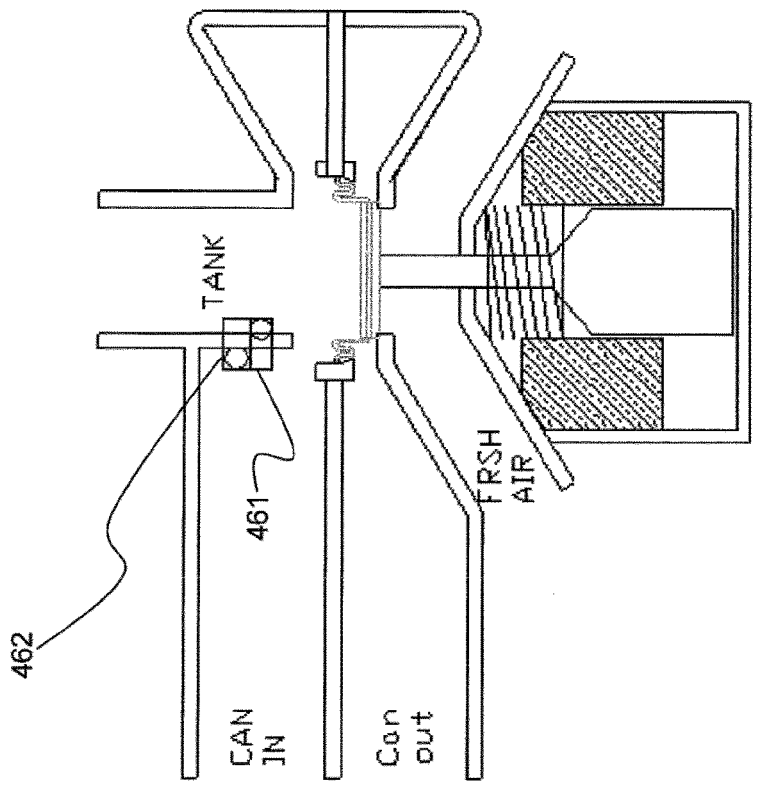

In another embodiment illustrated in FIG. 4C, the valves 461, 462 can be mounted between the tank and the canister.

On top of the housing 431 there is provided a circuit board 470 comprising a pressure sensor 471 and a temperature sensor 472, as well as an electrical connector 473. The module of FIG. 4 could be used in the configuration of FIG. 5A where the module is provided on a flange mounted in a wall of the tank.

Figure 5A:
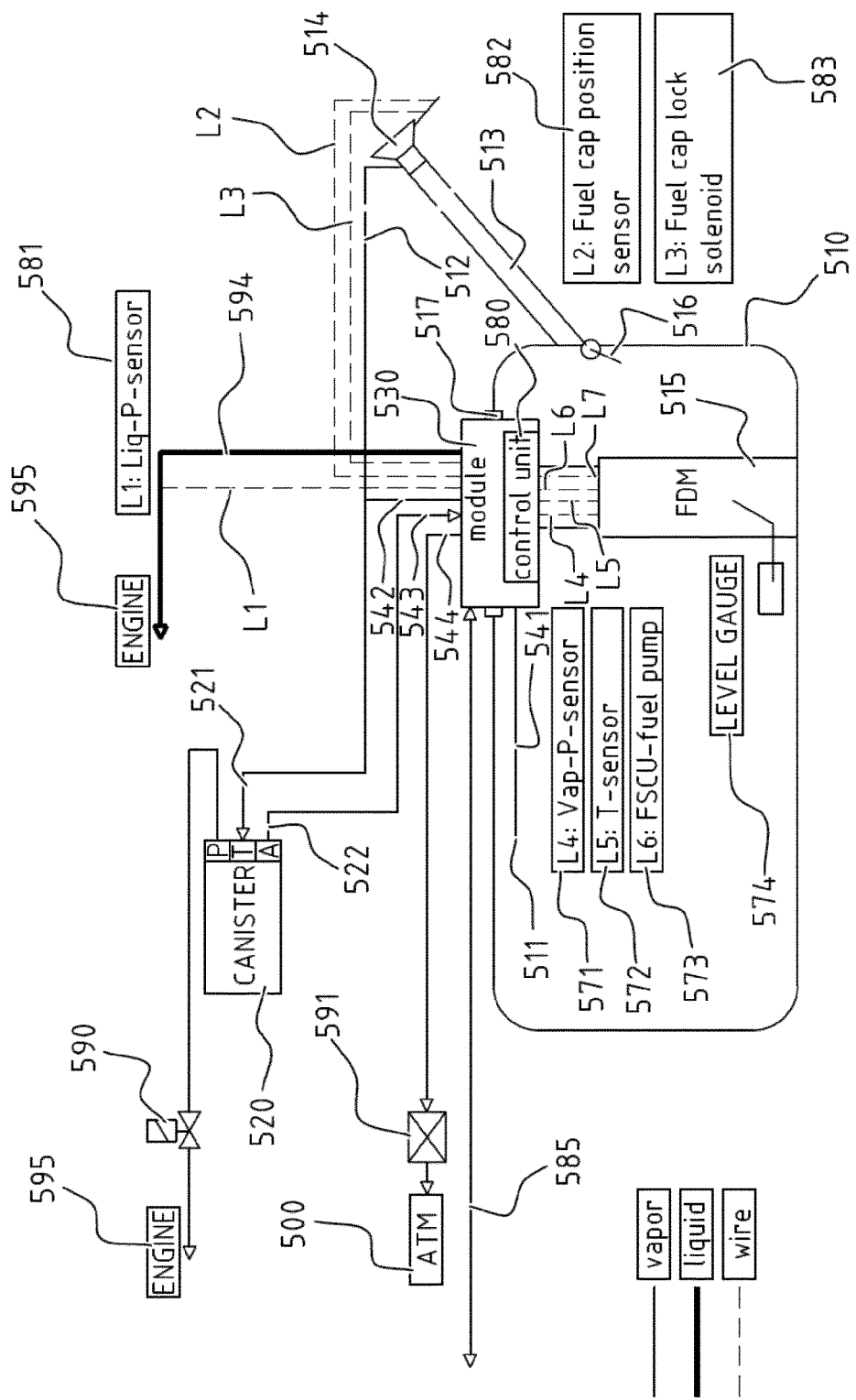
FIGS. 5A-5E illustrate five respective locations for an embodiment of a module according to the invention in a vehicle storage system.

Now further developed embodiments of a vehicle storage system with vapour control will be described with reference to FIGS. 5A-5E. In the embodiment of FIG. 5A, an embodiment of a module of the invention is provided on a flange mounted in a wall of the tank 510. Although the module 530 is shown to be integrated in a flange mounted in the top wall of the tank, it is noted that this flange can also be mounted in a side wall or in the bottom wall of the tank 510. The module 530 has four ports 541-544. The first port 541 is connected with a vapour outlet 511 of the tank 510. Further there may be provided a (non-illustrated) roll-over protection. It is noted that in the illustrated embodiment, the vapour outlet 511 and the first port 541 are formed as a single piece. The second port 542 is in fluid communication with the inlet 521 of the canister 520. The outlet 522 of the canister 520 is in fluid communication with the third port 543. The fourth port 544 is connected to an air filter 591, which is in fluid communication with the atmosphere 500. The module 530 can be implemented according to any of the above disclosed embodiments, and the four ports 541-544 correspond then with the four ports 141-144, 241-244, 341-344, or 441-444. When purging, the outlet 522 of the canister 520 is in communication with the atmosphere 500, so that air can be drawn into the outlet 522, through the canister medium, and through a canister purge valve 590 allowing fuel vapours stored in the canister 520 to be delivered to the engine 595.

Typical components that may be provided in the tank 510 are a fuel delivery module (FDM) 515, as well as a number of active components. The active components may comprise a vapour pressure sensor 571, a temperature sensor 572, a fuel system compile unit (FSCU)—fuel pump 573, and a level gauge 574. In a preferred embodiment, there is provided an electronic unit 580 in the module 530. This electronic control unit 580 may be connected through lines L4, L5, L6, L7 with the different active components in the tank 510.

The tank is provided with a filler pipe 513 closed by a fuel cap 514. There is provided an inlet check valve 516 at the connection between the tank body 510 and the filler pipe 513, which will block the communication between the filler pipe 513 and the tank body 510 when the tank is full. A recirculation line 512 is provided between an end part of the filler pipe 513 near the fuel cap 514, and the canister inlet 521. Further, there may be provided a fuel cap position sensor 582 and a fuel door lock solenoid 583, which communicate via respective lines L2 and L3 with the electronic control unit 580. Liquid fuel in the tank 510 can leave the tank through a line 594. Typically, there is provided a liquid pressure sensor 581 measuring the liquid pressure in line 594, at a location near the engine 595. This liquid pressure sensor 581 can also communicate electronically via line L1 with the control unit 580. The control unit 580 is further connected with a CAN bus 585 for communicating with the other electronic devices in the vehicle. Control signals received from any of the active components 571-574 and 582-584 can be used in the OBD strategy.

When the tank 510 needs refueling, and the driver of the vehicle stops at a petrol station, the following steps may be performed. Typically, the driver will push a button to indicate that he wishes to fill the tank 510. As a result, the closure body of the module 530 is moved to the second position allowing fluid communication between the tank 510 and the canister inlet 521, and between the canister outlet 522 and the atmosphere 500. Also, the recirculation line 512 ensures fluid communication between an end of the filler pipe 513 and the inlet of the canister 521. Moving the closure body of the module 530 to the second position allows depressurizing the tank 510. In a following step, the pressure in the tank is measured by the vapour pressure sensor 571. As long as the pressure is too high, the fuel cap 514 may not be opened. When the measured pressure has dropped below a critical value, the fuel cap 514 may be opened. This is made possible by activating the fuel cap lock solenoid 583. Now the driver may open the fuel cap 514. This opening of the fuel cap 514 is detected by the fuel cap position sensor 582, and communicated to the control unit 580. During filling of the tank 510, fuel vapours may escape out of the tank through the second port 542 and through the canister 520 into the atmosphere. Also, any vapours present in the filler pipe 513, may escape through recirculation line 512, and through the canister 520 into the atmosphere.

Figure 5B:
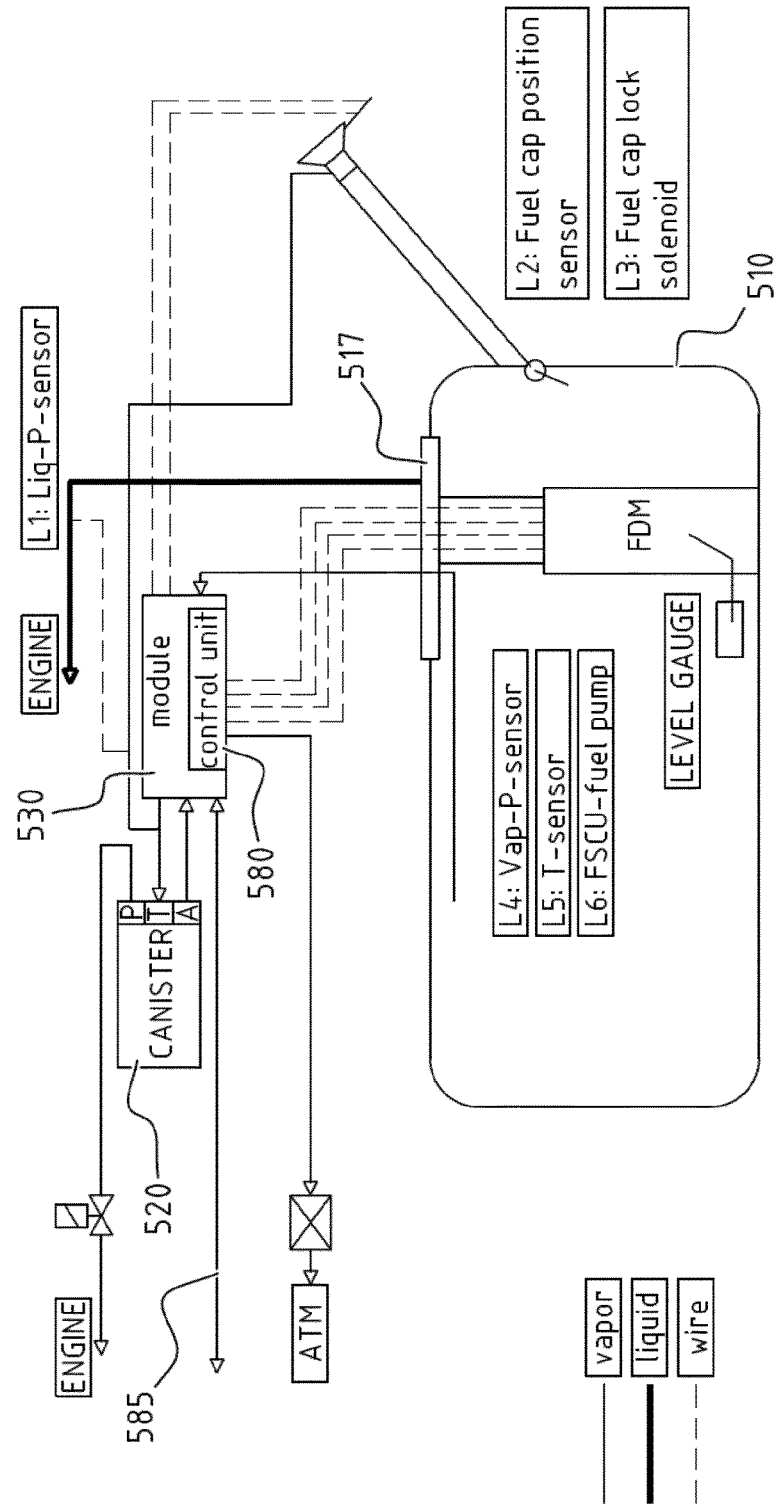

FIG. 5B illustrates an embodiment where the module 530 is located in a different position near the canister 520. Also, in this embodiment there may be provided a control unit 580 in the module 530. According to a non-illustrated variant thereof, the control unit 580 could be provided on the flange 517 for closing the tank 510. The connections in FIG. 5B are similar to the connections in the embodiment of FIG. 5A and hence, the description thereof is omitted.

Figure 5C:
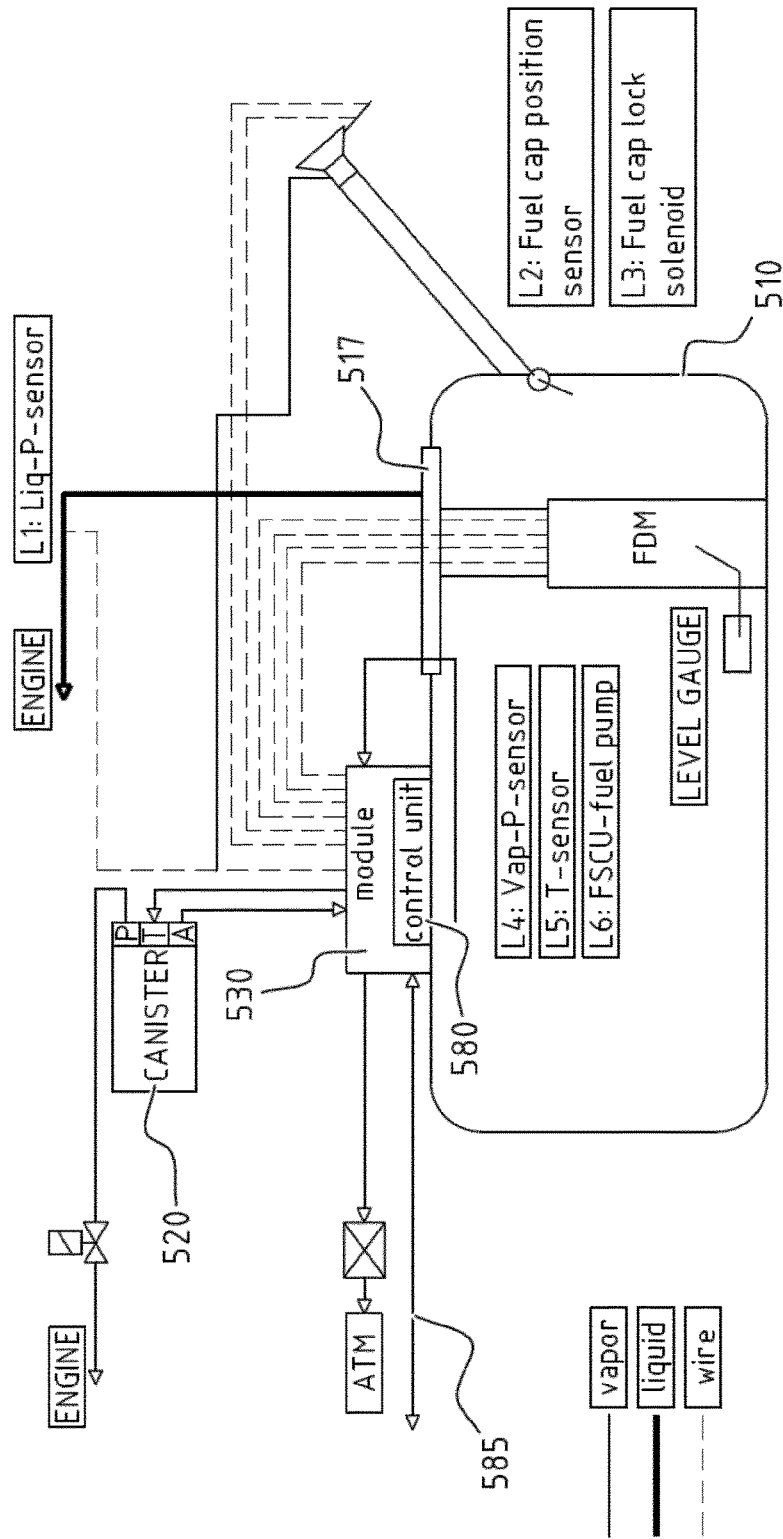

FIG. 5C illustrates yet another embodiment, where the module 530 is provided on top of the tank 510. Also, in this embodiment there may be provided a control unit 580 in the control unit 530. As for the embodiment of FIG. 5B, it is noted that the control unit could also be provided on the flange 517 for closing the tank 510. The connections in FIG.

5C are similar to the connections in the embodiment of FIG. 5A and hence, the description thereof is omitted.

Figure 5D:
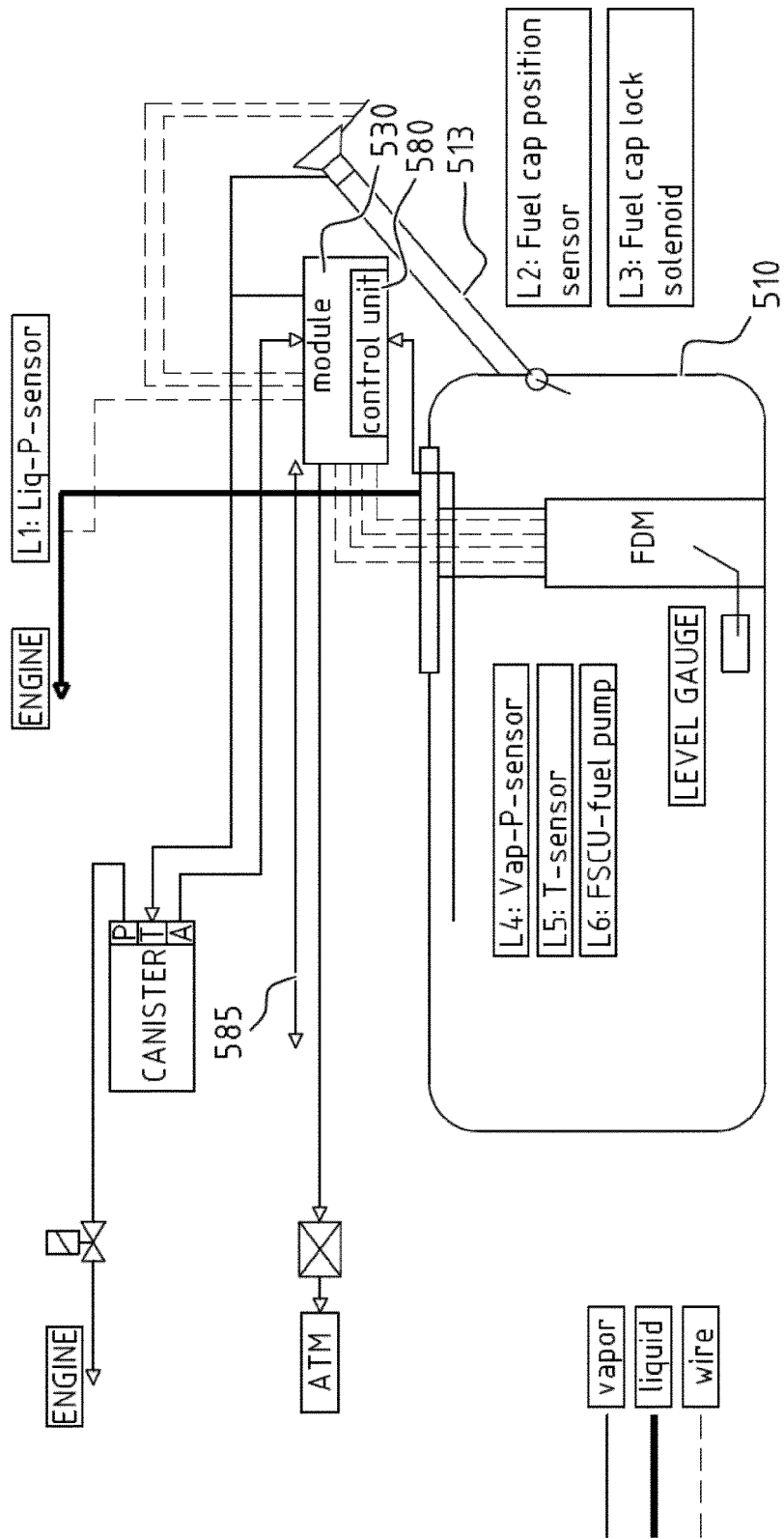

In the embodiment of FIG. 5D, the module 530 is provided adjacent the filler pipe 513. Also, such an embodiment may lead to a very compact system. The comments made for the embodiments of FIGS. 5B and 5C also apply for the embodiment of FIG. 5D.

Figure 5E:
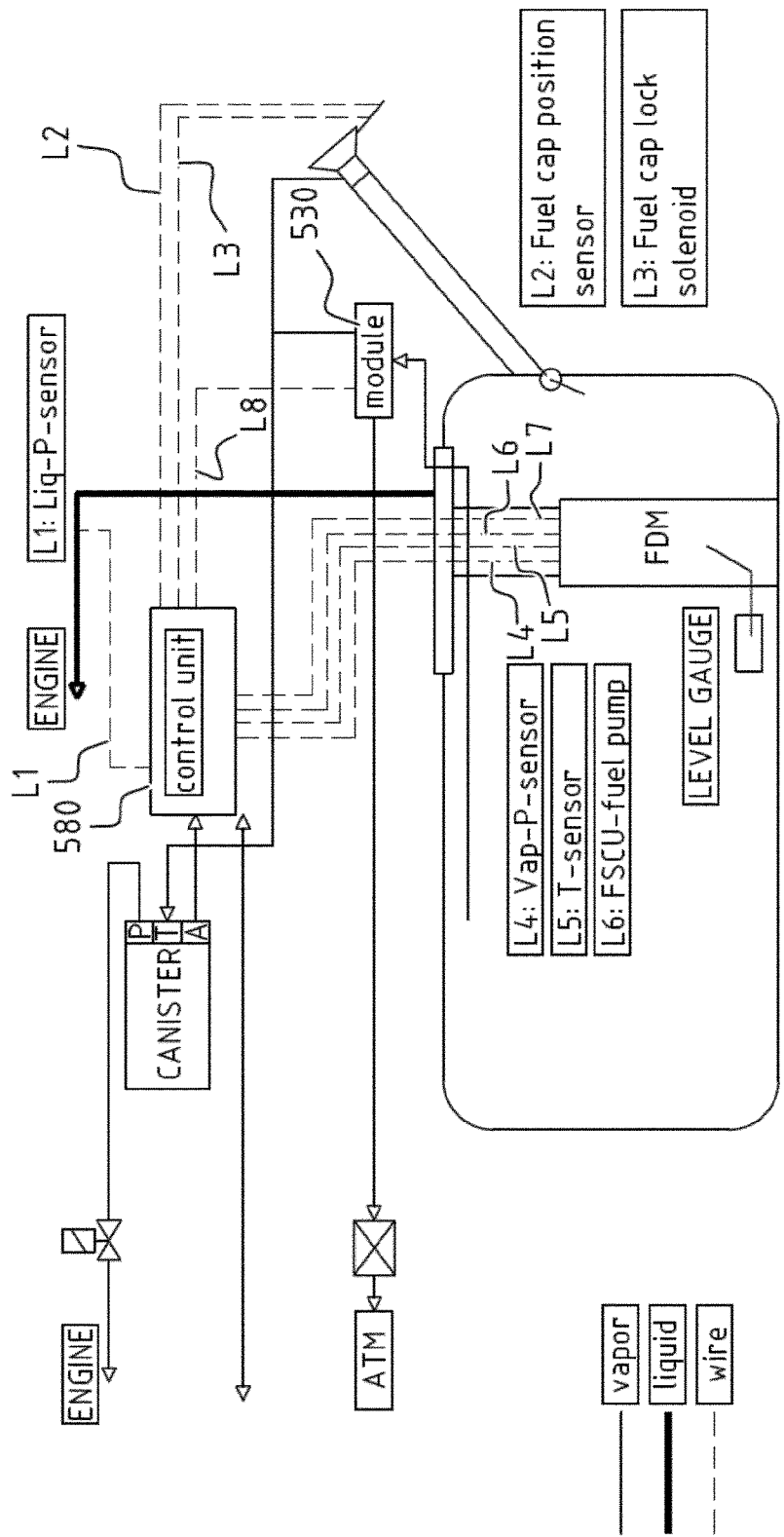

The vehicle storage system of FIG. 5E is similar to the embodiment of FIG. 5D, with this difference that the control unit 580 is provided adjacent the canister 520, while the module 530 is provided adjacent the filler pipe 513. There is provided an additional line L8 for controlling the actuator of the module 530. According to yet other embodiments, there could be provided two control units, one control unit in the module 530, as well as a separate control unit at a distance of the module 530.

Figure 6:
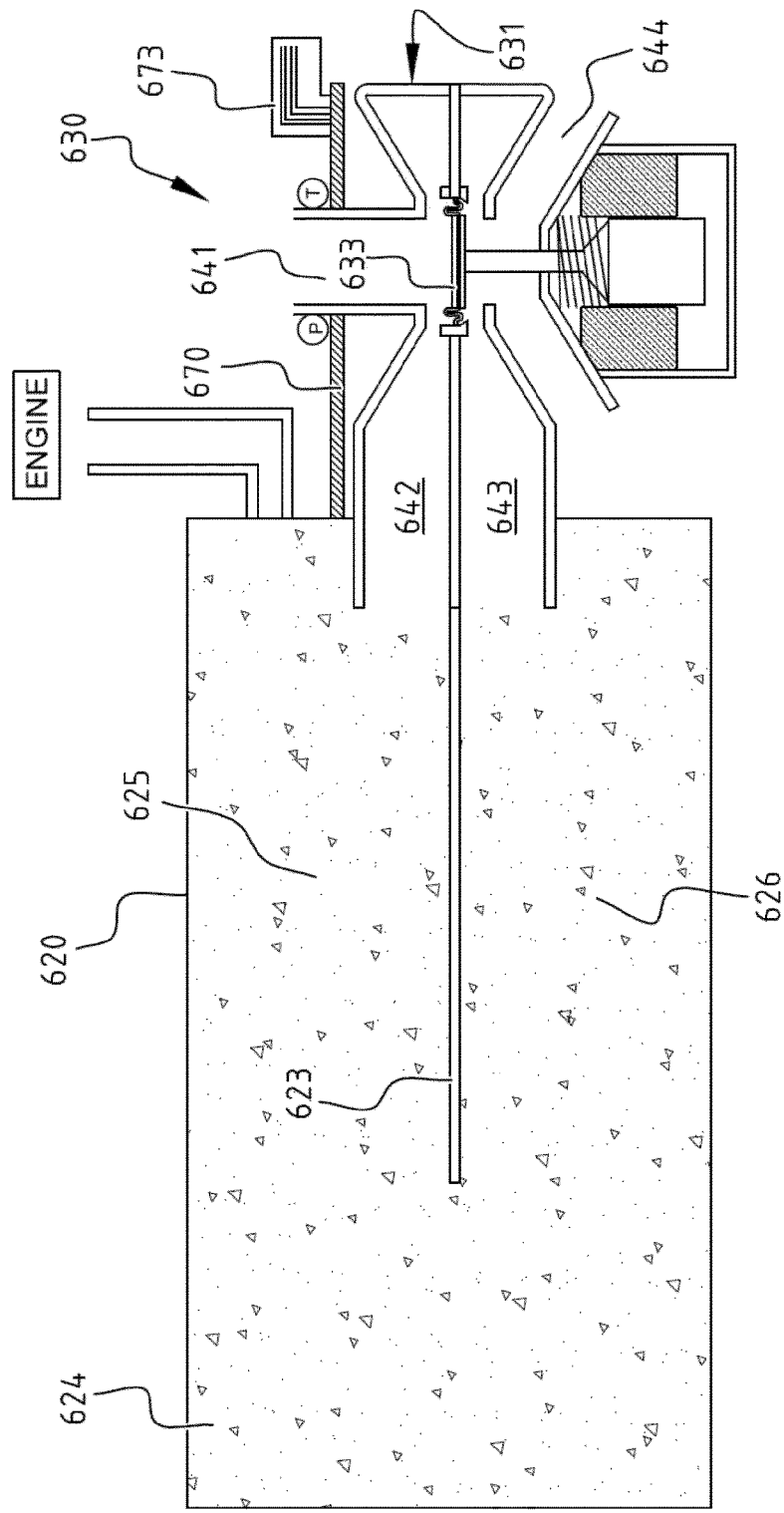
FIG. 6 illustrates schematically a further embodiment of the invention wherein a module is integrated in the canister.

FIG. 6 illustrates a further embodiment of the invention including a module 630 integrated in a canister 620. The module 630 is similar to the module 430 of FIGS. 4A and 4B and comprises a housing 631 with a first, second, third and fourth port 641, 642, 643, 644. A closure body 633 is arranged in the housing 631. The second and third port 642 and 643 extend in the canister 620. In the illustrated embodiment the second and third port 642 and 643 have a common wall part 623 extending in the canister material 624 and forming a buffer wall 623 between a vapour rich chamber 625 and a vapour free chamber 626. As in the embodiment of FIG. 4, there may be provided on top of the housing 631 a circuit board 670 comprising a pressure sensor and a temperature sensor, as well as an electrical connector 673.

This leads to a compact canister structure including the necessary control means.

Figure 7A:
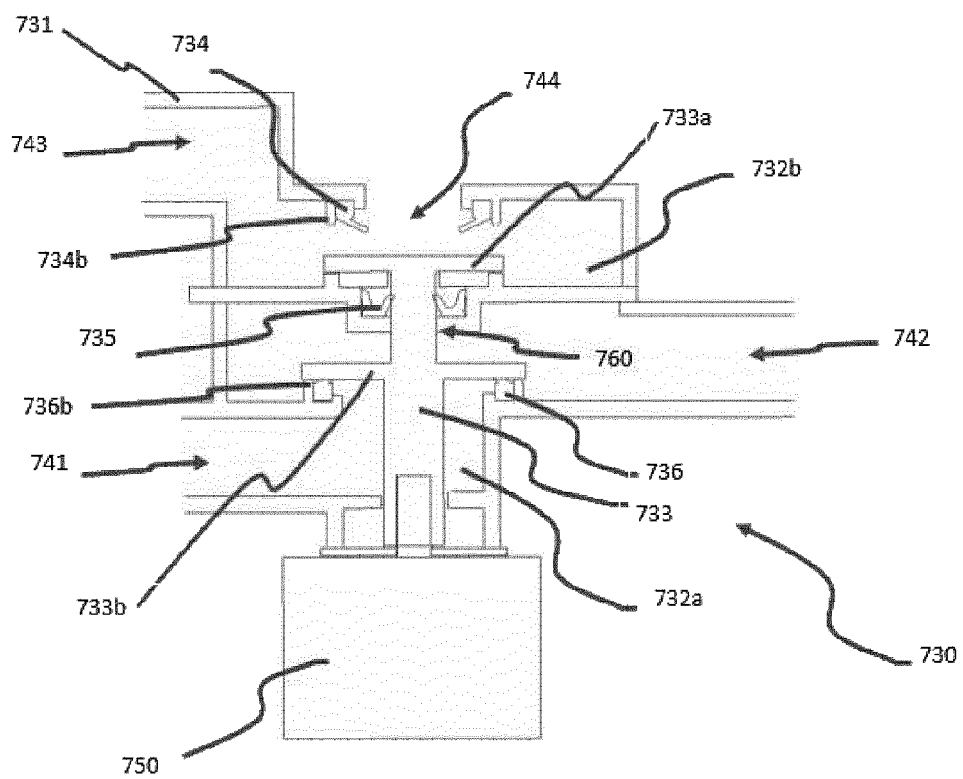
FIGS. 7A-7C are schematic views illustrating a further embodiment of a vehicle storage system of the invention, wherein the closure body is located in a first, a second, and a third position, respectively.
Figure 7B:
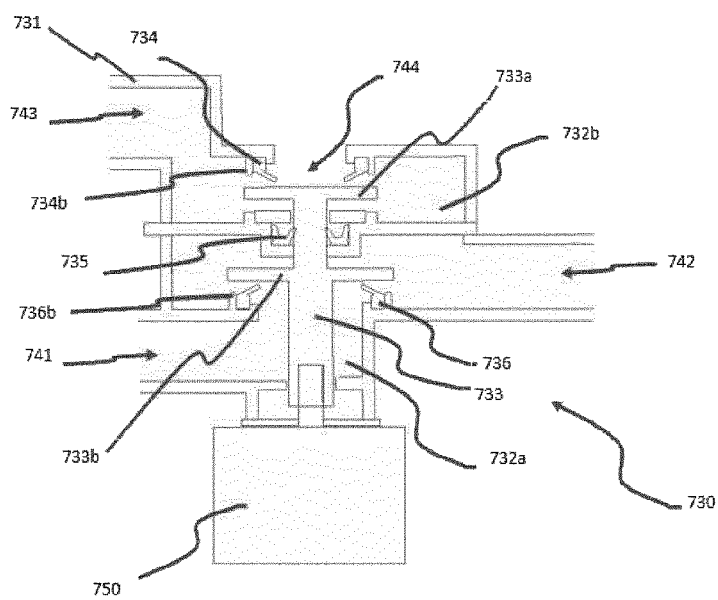
Figure 7C:
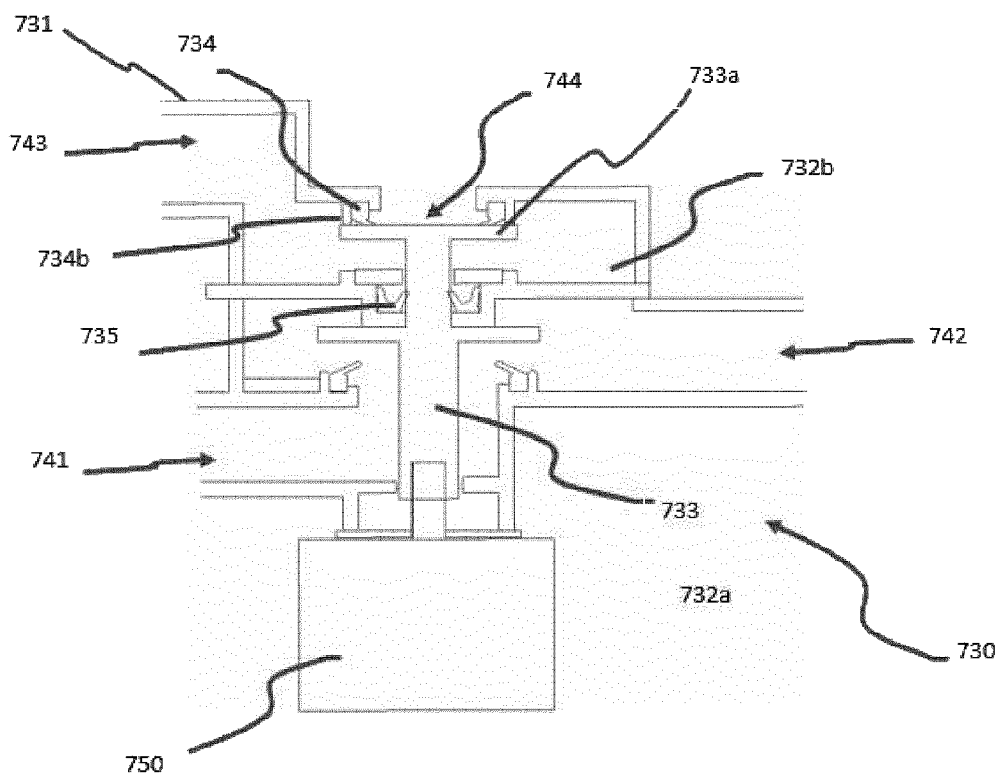

FIGS. 7A-7C illustrate a further embodiment of a module for a vehicle storage system with vapour control according to the invention. The module 730 comprises a housing 731 having a first port 741, a second port 742, a third port 743, and a fourth port 744. The second port 742 is intended for communicating with a canister inlet. The third port 743 is intended for communicating with a canister outlet. The fourth port 744 is in communication with the atmosphere. A closure body 733 is movably arranged in the housing 731. The closure body 733 is slidably mounted through a hole 760. The closure body 733 is moved by an actuator 750. The closure body 733 comprises two poppets 733a and 733b. These poppets are arranged such that they can move around a sliding seal 735. In a first position illustrated in FIG. 7A, the poppet 733b is brought into contact against a shim 736b so as to compress the c-ring seal 736. In a third position illustrated in FIG. 7C, the poppet 733a is brought into contact against a shim 734b so as to compress the c-ring seal 734. The embodiment of FIGS. 7A-7C is particularly advantageous since it increases tightness, reduces permeability, reduces power consumption (i.e. less power is needed to move the closure body 733) and increases lifetime of the module 730.

Figure 8A:
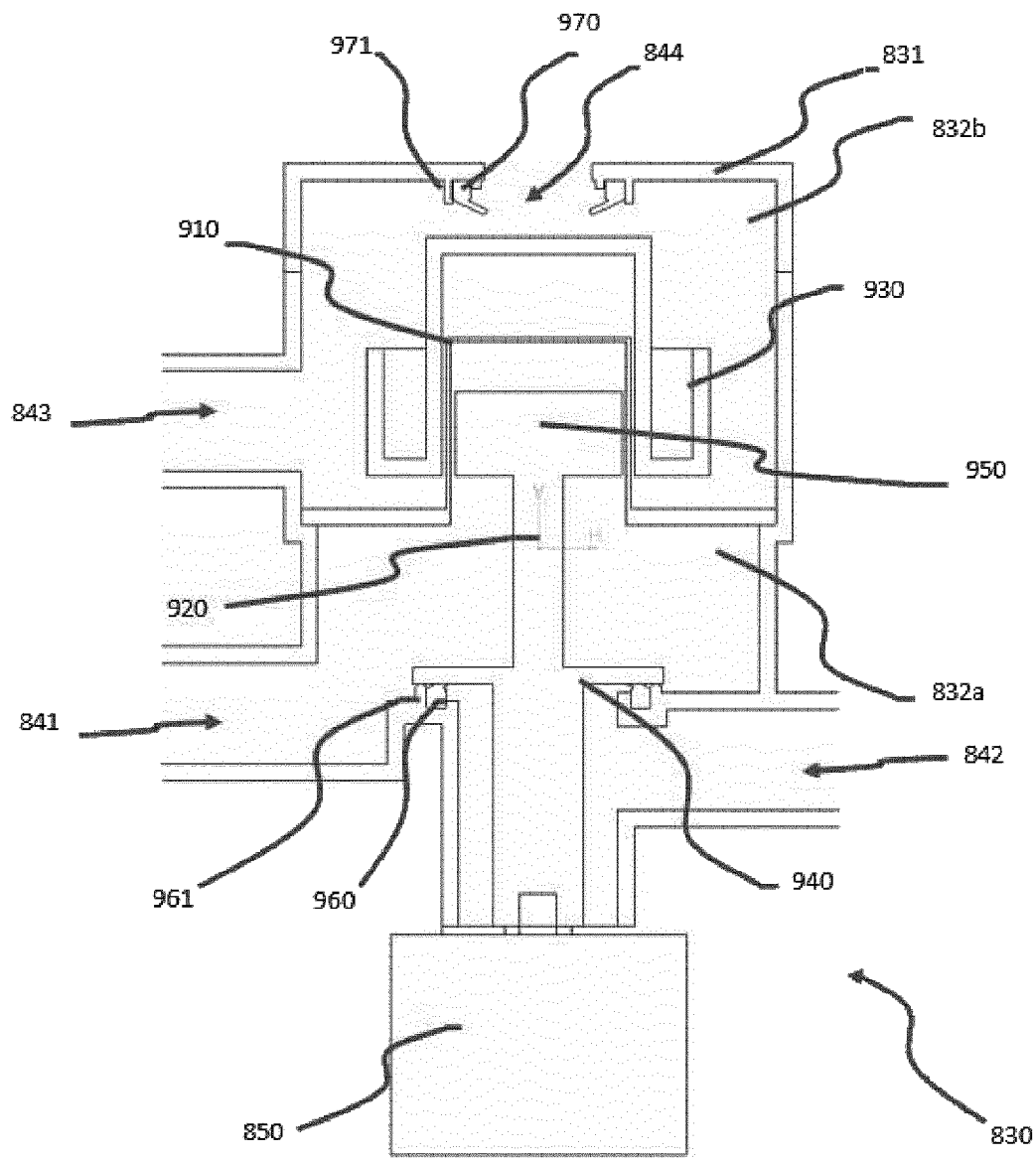
FIGS. 8A-8C are schematic views illustrating a further embodiment of a vehicle storage system of the invention, wherein the closure body is located in a first, a second, and a third position, respectively.
Figure 8B:
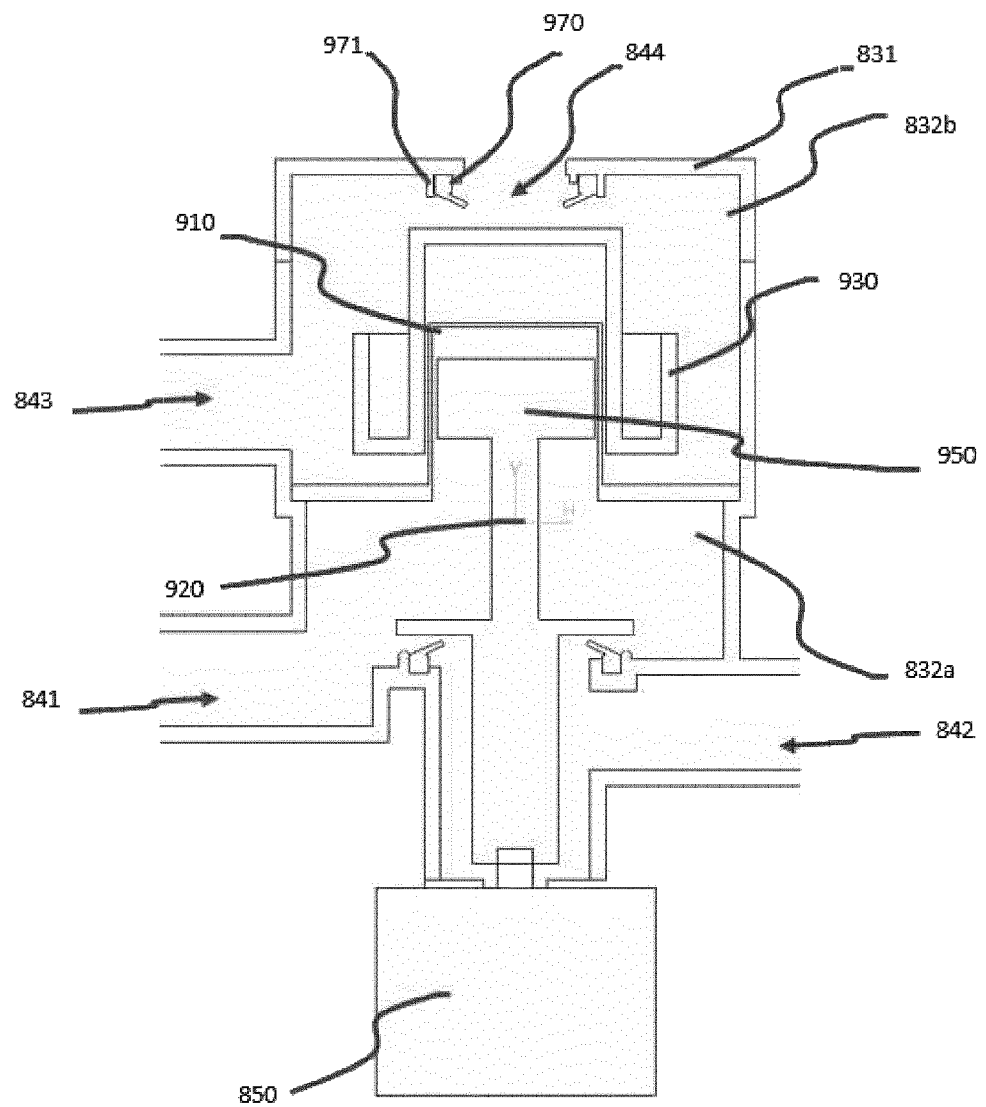
Figure 8C:
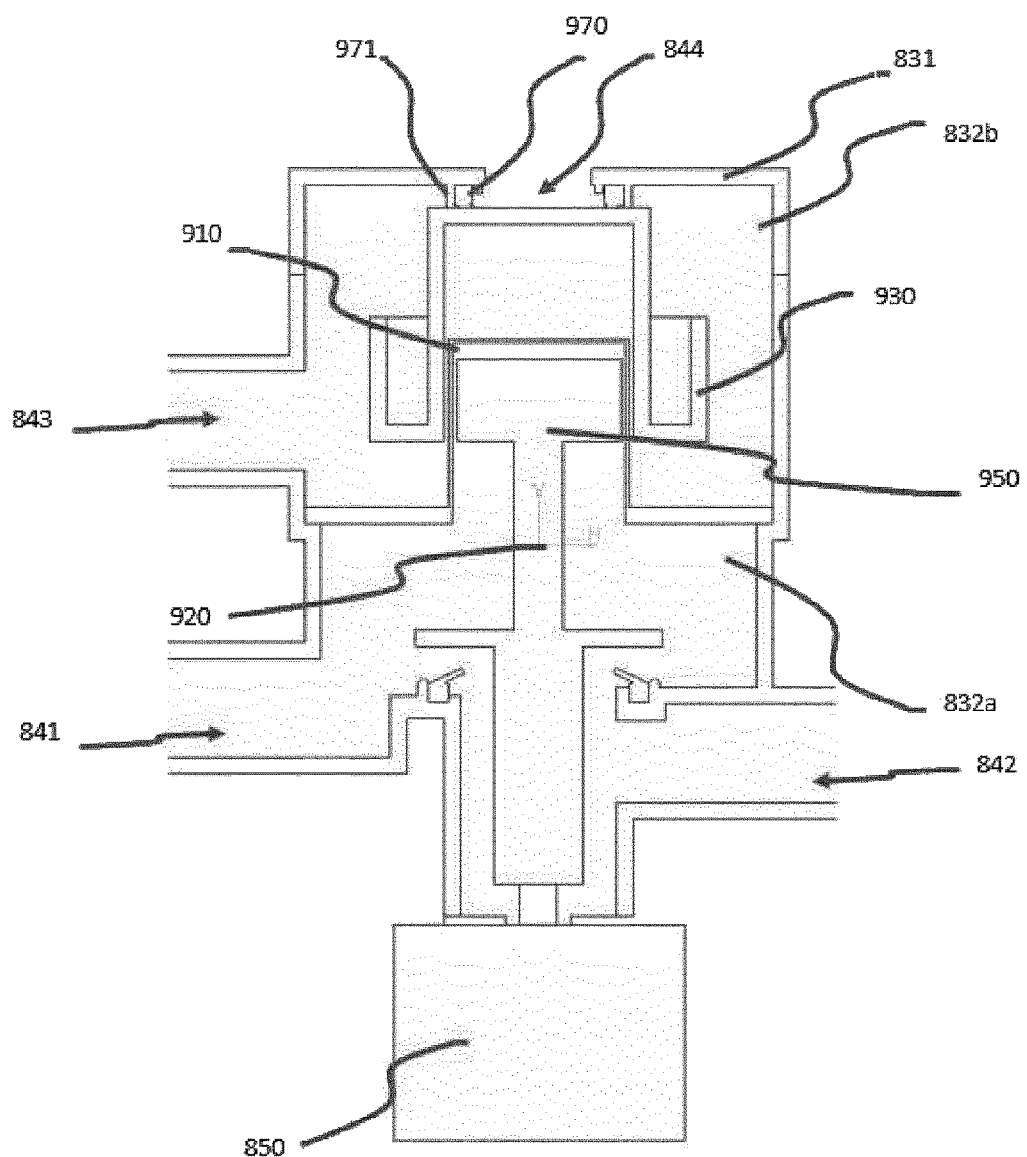

FIGS. 8A-8C illustrate a further embodiment of a module for a vehicle storage system with vapour control according to the invention. The module 830 comprises a housing 831 having a first port 841, a second port 842, a third port 843, and a fourth port 844. The second port 842 is intended for communicating with a canister inlet. The third port 843 is intended for communicating with a canister outlet. The fourth port 844 is in communication with the atmosphere. The housing 831 comprises a magnet cup 910 which separates a first volume 832a and a second volume 832b. Two closure bodies 920 and 930 are movably arranged in the housing 831. The closure body 920 is movably arranged in the first volume 832a and the closure body 930 is movably arranged in the second volume 832b. The closure body 920 comprises a poppet 940 and a driver magnet 950. The closure body 930 is a follower magnet that cooperates with the driver magnet 950. The closure body 920 is moved by an actuator 850. The closure body 930 is magnetically driven by the driver magnet 950. In a first position illustrated in FIG. 8A, the poppet 940 is brought into contact against a shim 761 so as to compress a c-ring seal 760. In a third position illustrated in FIG. 7C, the driver magnet 950 is moved to the top end of the magnet cup 910 so as to displace the follower magnet 930. The follower magnet 930 is brought into contact against a shim 971 so as to compress the c-ring seal 970. The embodiment of FIGS. 8A-8C is particularly advantageous since it increases tightness (i.e. magnet cup 910 prevents any fluid communication between first volume 832a and second volume 832b), reduces permeability, reduces power consumption (i.e. less power is needed to move the closure body 733) and increases lifetime of the module 730.

Whilst the principles of the invention have been set out above in connection with specific embodiments, it is to be understood that this description is merely made by way of example and not as a limitation of the scope of protection which is determined by the appended claims.

The invention claimed is:

1. A vehicle storage system with vapor control, comprising:
    a vehicle tank including a vapor outlet;
    a filter unit including a filter inlet and a filter outlet;
    a housing including a first port communicating with the vapor outlet, a second port communicating with the filter inlet, a third port communicating with the filter outlet, and a fourth port;
    a closure body being moveably arranged in the housing; wherein the closure body is configured:
    to close the third port and the fourth port in a first position of the closure body;
    to create in the housing a barrier between a first volume and a second volume in a second position of the closure body, the first volume forming a passage between the first port and the second port, and the second volume forming a passage between the third port and the fourth port; and
    to close the first port and the second port in a third position of the closure body.

2. A vehicle storage system according to claim 1, wherein the vehicle tank is a fuel tank and the filter unit is an evaporation canister.

3. A vehicle storage system according to claim 1, further comprising an actuator configured to position the closure body in at least the first, second, and third position.

4. A vehicle storage system according to claim 3, further comprising a controller to control the actuator.

5. A vehicle storage system according to claim 4, further comprising a detection means for detecting a filling modus in which liquid is added in the vehicle tank; wherein the controller is configured to control the actuator to place the closure body in the second position upon detection of the filling modus.

6. A vehicle storage system according to claim 4, further comprising a purging system configured to purge the filter unit during a purging modus; wherein the controller is configured to control the actuator to place the closure body in the third position upon entering the purging modus.

7. A vehicle storage system according to claim 4, further comprising a detection means for detecting a leakage modus or a parking modus of the vehicle; wherein the controller is configured to control the actuator to place the closure body in the first position upon detection of the leakage modus or the parking modus.

8. A vehicle storage system according to claim 3, wherein the actuator is an electromechanical actuator.

9. A vehicle storage system according to claim 8, wherein the actuator comprises a solenoid coil and a solenoid core, the solenoid core being coupled with the closure body for moving and/or keeping the closure body to/in the first, second, or third position as a function of power in the solenoid coil.

10. A vehicle storage system according to claim 9, wherein the actuator further comprises at least one permanent magnet or at least one mechanical stop configured to maintain the closure body in any position of the first, second, and third position, or in one position of the first, second, and third position; the at least one permanent magnet or at least one mechanical stop being configured such that the closure body can be moved away from any position of the first, second, and third position to any other position of the first, second, and third position, by powering the solenoid coil.

11. A vehicle storage system according to claim 1, wherein the closure body comprises a diaphragm fixed in the housing.

12. A vehicle storage system of claim 11, wherein the diaphragm comprises at least one rigid part and at least one flexible part, the rigid part being configured to ensure the closing in the first and third position of the closure body, and the flexible part being configured to allow movement of the closure body between the first, second, and third position.

13. A vehicle storage system of claim 11, wherein the diaphragm comprises a flexible membrane provided at a first side with a first rigid layer and at a second side with a second rigid layer; the first and second layer being configured to ensure the closing in the first and third position of the closure body, respectively; and the flexible membrane being configured to allow movement of the closure body between the first, second, and third position.

14. A vehicle storage system according to claim 3, wherein the closure body is guided in the housing to be translated between the first, second, and third position, and the actuator is configured to translate the closure body between the first, second, and third positions.

15. A vehicle storage system according to claim 3, wherein the closure body is rotatably mounted in the housing, and the actuator is configured to rotate the closure body to the first, second, or third position.

16. A vehicle storage system according to claim 1, wherein the housing is arranged on the vehicle tank, or on a mounting flange arranged in a wall of the vehicle tank.

17. A vehicle storage system according to claim 1, wherein the housing is arranged adjacent the filter unit, the filter unit being a canister comprising absorbent material, wherein the second port and the third port extend in the filter unit, wherein a buffer wall separating the first and second port extends in the absorbent material of the canister.

18. A vehicle storage system according to claim 1, wherein the vehicle tank includes a filler pipe which is closable by a fuel cap, the filler pipe having an end adjacent the fuel cap which is connected through a recirculation line with the filter inlet.

19. A module for use in a vehicle system with vapor control, the module comprising:
a housing including a first port, a second port, a third port, and a fourth port;
a closure body being moveably arranged in the housing; wherein the closure body is configured:
to close the third and the fourth port in a first position of the closure body;
to create a barrier in the housing between a first volume and a second volume in a second position of the closure body; the first volume creating a passage between the first and the second port and the second volume creating a passage between the third and fourth port; and
to close the first and the second port in a third position of the closure body.

20. A module according to claim 19, further comprising an actuator configured to position the closure body in at least the first, second, and third position.

21. A module according to claim 20, further comprising a controller to control the actuator.

22. A module according to claim 20, wherein the actuator comprises a solenoid coil and a solenoid core, the solenoid core being coupled with the closure body to move the closure body to the first, second, or third position as a function of power.

23. A module according to claim 21, wherein the actuator comprises a stepping motor attached to the closure body to move the closure body to the first, second, or third position.

24. A module according to claim 19, wherein the closure body comprises a diaphragm fixed in the housing.

25. A module of claim 24, wherein the diaphragm comprises at least one rigid part and at least one flexible part, the rigid part being configured to ensure the closing in the first and third position of the closure body, and the flexible part being configured to allow movement of the closure body between the first, second, and third position.

26. A module of claim 24, wherein the diaphragm comprises a flexible membrane provided at a first side with a first rigid layer and at a second side with a second rigid layer; the first and second rigid layer being configured to ensure the closing in the first and third position of the closure body, respectively; and the flexible membrane being configured to allow movement of the closure body between the first, second, and third position.

27. A module of claim 19, wherein an over-pressure relief mechanism and/or an under-pressure relief mechanism is arranged in the housing.

28. A module of claim 27, wherein the over-pressure relief mechanism and/or the under-pressure relief mechanism is arranged in a wall part of the housing near the first port and/or in a wall part near the fourth port.

29. A module of claim 24, wherein the diaphragm acts as an OPR and or UPR depending on the position of the module.

30. A module of claim 19, wherein the housing includes a recess for an electronic control unit.

31. A module of claim 30, wherein the electronic control unit is configured to be connected with at least one active component in a vehicle tank; and/or with a CAN bus; and/or with a fuel cap position sensor to detect a position of a fuel cap; and/or with a fuel cap lock solenoid to activate or deactivate a locking of the fuel cap; and/or with a liquid pressure sensor to measure pressure of liquid fuel in a line between the vehicle tank and an engine.

32. A method, comprising: utilizing a module according to claim 19 in a vehicle storage system with vapor control.

* * * * *